(12) United States Patent
Cheng et al.

(10) Patent No.: US 8,405,678 B2
(45) Date of Patent: Mar. 26, 2013

(54) DISPLAY CONTROLLER FOR DISPLAYING MULTIPLE WINDOWS AND METHOD FOR THE SAME

(75) Inventors: Kun-Nan Cheng, Hsinchu Hsien (TW);
Yuan-Chuan Hsu, Hsinchu Hsien (TW);
Hung-Yi Lin, Hsinchu (TW);
Chung-Ching Chen, Hsinchu Hsien (TW)

(73) Assignee: MSTAR Semiconductor, Inc., Hsinchu Hsien (TW)

( * ) Notice: Subject to any disclaimer, the term of this patent is extended or adjusted under 35 U.S.C. 154(b) by 1365 days.

(21) Appl. No.: 12/149,346

(22) Filed: Apr. 30, 2008

(65) Prior Publication Data

US 2008/0266305 A1  Oct. 30, 2008

Related U.S. Application Data

(60) Provisional application No. 60/914,763, filed on Apr. 30, 2007.

(51) Int. Cl.
*G09G 5/00* (2006.01)
*G09G 5/36* (2006.01)
(52) U.S. Cl. ........................ 345/629; 345/560
(58) Field of Classification Search .................. 345/560, 345/629
See application file for complete search history.

(56) References Cited

U.S. PATENT DOCUMENTS

| 5,450,130 | A | * | 9/1995 | Foley | 348/391.1 |
| 5,619,226 | A | * | 4/1997 | Cahill, III | 345/667 |
| 5,671,433 | A | * | 9/1997 | Fung et al. | 712/43 |
| 5,877,741 | A | * | 3/1999 | Chee et al. | 345/629 |
| 6,515,672 | B1 | * | 2/2003 | Sheaffer et al. | 345/534 |
| 6,674,430 | B1 | * | 1/2004 | Kaufman et al. | 345/419 |
| 6,680,752 | B1 | * | 1/2004 | Callway et al. | 348/448 |
| 6,873,341 | B1 | * | 3/2005 | Adams et al. | 345/629 |
| 7,142,251 | B2 | * | 11/2006 | Sha et al. | 348/557 |
| 2006/0033753 | A1 | * | 2/2006 | Lai | 345/629 |

FOREIGN PATENT DOCUMENTS

CN  1726530  1/2006

\* cited by examiner

*Primary Examiner* — Joni Richer
(74) *Attorney, Agent, or Firm* — WPAT PC; Justin King

(57) ABSTRACT

A display controller for displaying multiple windows and associated memory access method are provided. The display controller receives a first video source and a second video source for displaying multiple windows, and includes a line buffer, a deinterlacer, a scaler, and a memory interface unit. The line buffer buffers pixel data of a non-overlapped area of a main image associated with the first video source, and pixel data of a sub image associated with the second video source. The deinterlacer is coupled to the line buffer for selectively deinterlacing data in the line buffer. The scaler is coupled to the deinterlacer for selectively scaling data outputted from the deinterlacer. The memory interface unit is coupled to the line buffer for accessing an external memory.

21 Claims, 10 Drawing Sheets

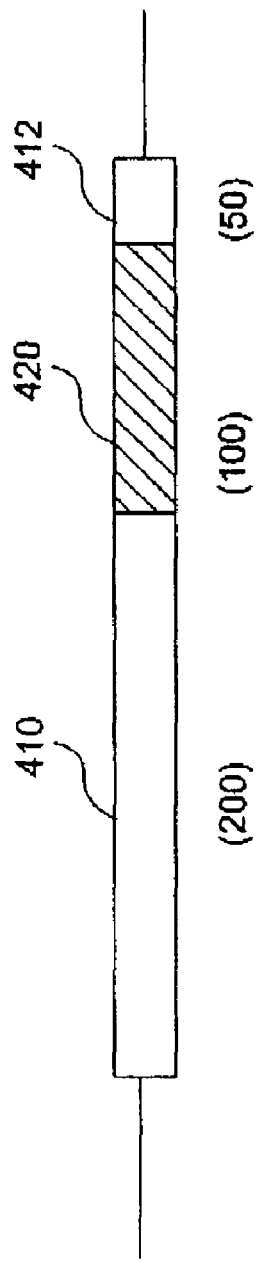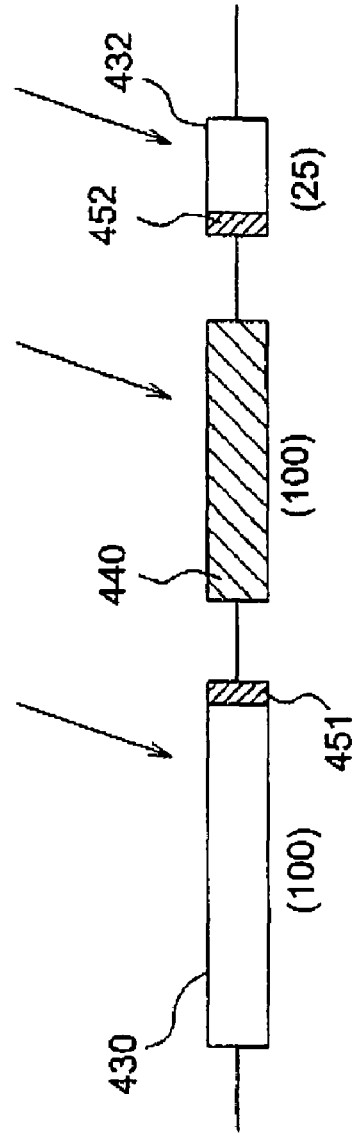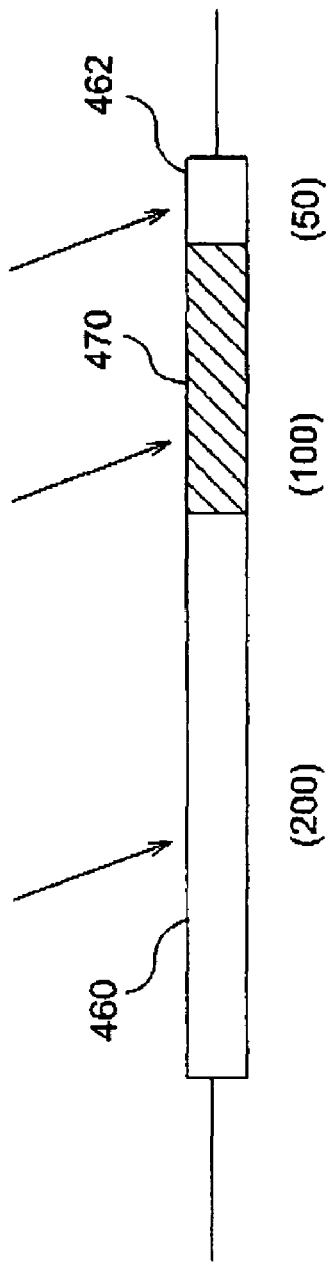

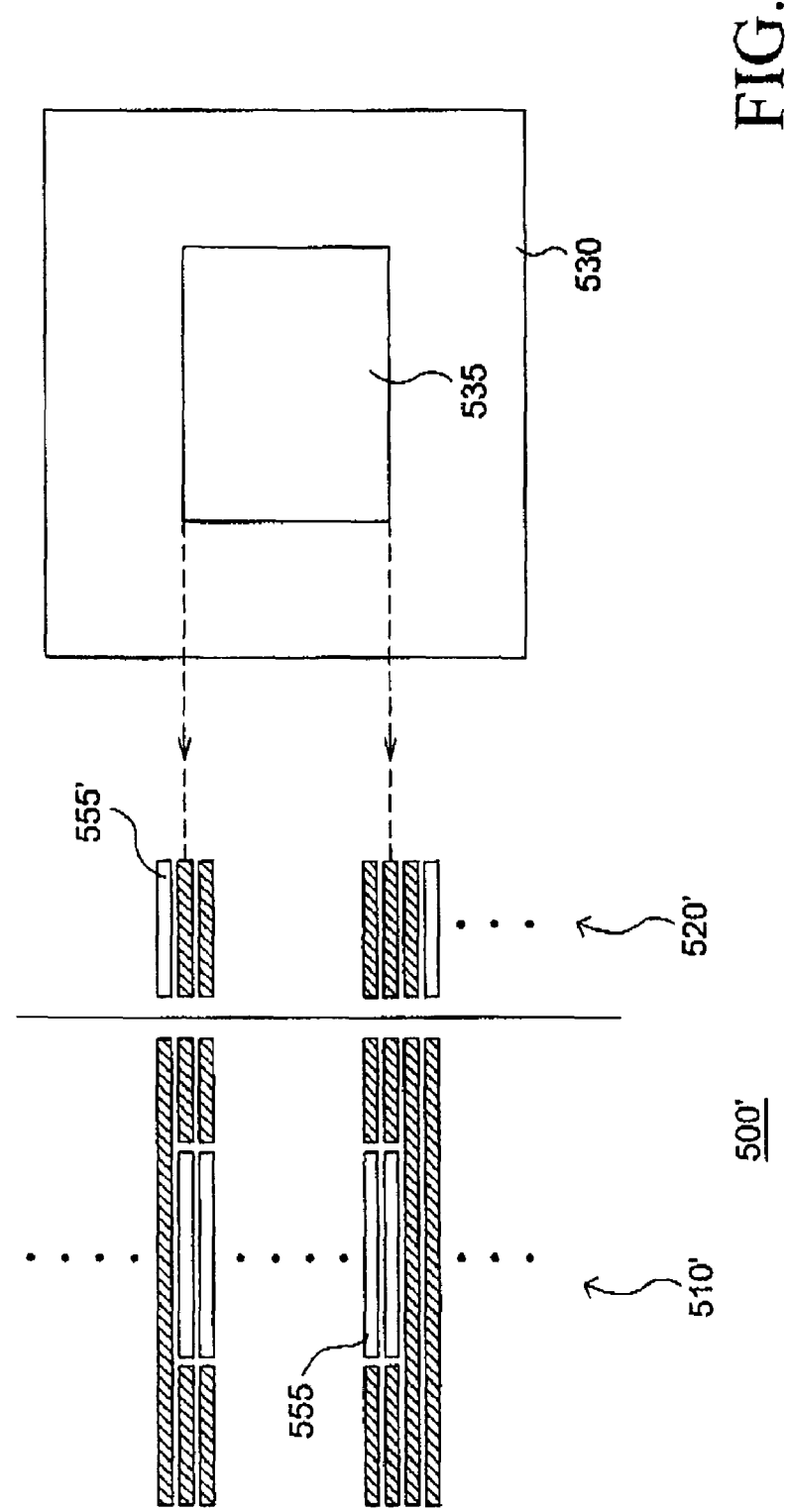

| | | | | |
|---|---|---|---|---|
| L1 | main data 1 | main data 2 | main data 3 | |
| L2 | main data 1 | main data 2 | main data 3 | |
| L3 | main data 1 | main data 2 | main data 3 | |
| L4 | main data 1 | main data 2 | main data 3 | sub data |
| L5 | main data 1 | main data 2 | main data 3 | sub data |
| L6 | main data 1 | main data 2 | main data 3 | sub data |
FIG. 6A
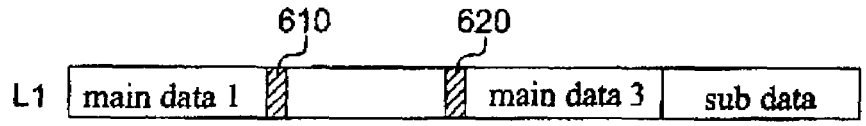
FIG. 6B
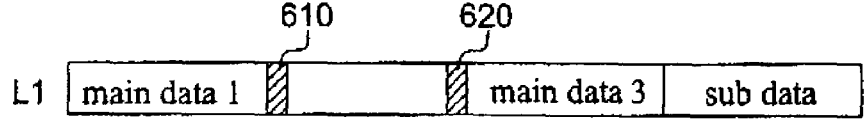
FIG. 6C

DISPLAY CONTROLLER FOR DISPLAYING MULTIPLE WINDOWS AND METHOD FOR THE SAME

CROSS REFERENCE TO RELATED APPLICATIONS

This application claims the right of priority based on U.S. Provisional Patent Application 60/914,763 entitled "PIP/POP Display Controller with Shared Line Buffer and Associated Method", filed on Apr. 30, 2007, which is incorporated herein by reference and assigned to the assignee herein.

FIELD OF INVENTION

The invention relates to a display controller and a method for the same, and more particularly, to a display controller for displaying multiple windows and a method for the same.

BACKGROUND OF THE INVENTION

Generally, the display controller in the display system processes image data from different video sources for display. The image data from different sources may comply with different display formats, and require different image processes. For example, the traditional television signals need to be deinterlaced and scaled for displaying a desired image on a screen. On the other hand, the progressively scanned image signals need to be scaled to appropriate size for display. In the multiple windows display, such as PIP or POP, in order to display the main window together with the sub window, the conventional display controller needs to be equipped with at least two independent sets of circuits for processing the signals from different video sources.

FIG. 1 shows a block diagram of a multi-window display system 100 according to the prior art. The display system 100 includes a display controller 110, external buffers 142 and 144, and a display panel 190. The display controller 110 includes a first line buffer 152 and a second line buffer 154, a first deinterlacer 162 and a second deinterlacer 164, a first scaler 172 and a second scaler 174, and a mixer 180. The display controller 110 is coupled to the external buffers 142 and 144, e.g. dynamic random access memory. The display controller 110 receives a first video source and a second video source, which can be an analog video source or a digital video source, for multi-window display. For example, the first and the second video sources may be two different video signals, or one TV signal and one DVD signal. The display controller 110 may preprocess the received video sources. For example, when the resolution of the video source is higher than the resolution of the outputted image, a down-sampling process may be performed on the video sources to reduce the required capacity of the line buffers 152 and 154 and the external buffers 142 and 144. The external buffers 142 and 144 respectively buffer image data of the first video source and the second video source. The line buffers 152 and 154 buffer a plurality of scan lines of the first and the second video sources respectively. The deinterlacers 162 and 164 respectively interlace scan line data buffered in the line buffers 152 and 154. The scalers 172 and 174 scale the image data which have been deinterlaced by the deinterlacers 162 and 164 respectively. Finally, the mixer 180 mixes the scaled image data associated with the first and the second video sources and then the mixed output is multi-window displayed on the display panel 190.

Each display image includes, depending on the display standard, 525 scan lines. The line buffers 152 and 154 are capable of buffering a plurality of scan lines. Since the line buffers 152 and 154 are embedded inside the display controller 110, the gate count and the manufacturing cost will increase for storing more Scan line data in the line buffers 152 and 154. In addition, the structure of the deinterlacers 162 and 164 and the scalers 172 and 174 are complicated, and therefore the cost of two independent sets of hardware structure is high. There are several standards of display resolution, such as a WXGA, UXGA, full HD, and et al. As the display resolution raises, the required capacity of the line buffers 152 and 154 and the external buffers 142 and 144 also increases. For example, when the high-resolution display is up to 1920*1080 with the multi-window display, the required capacity of the external buffers 142 and 144 increases significantly. To meet the requirement of high-resolution display, the prior art must increase the capacity of the line buffers 152 and 154 and the external buffers 142 and 144. To access large amount of data for multi-window display for high display resolution, the prior art adopts the high-end DRAMs with high capacity for the independent external buffers 142 and 144, to avoid image destruction. Therefore, the display controller 110 requires the independent corresponding hardware interface, namely, the display controller 110 requires additional pins for connecting with the independent external buffers 142 and 144.

Therefore, it is necessary to provide a display controller for displaying multiple windows which can reduce the whole hardware cost.

SUMMARY OF THE INVENTION

The present invention discloses a display controller for displaying multiple windows and associated memory access method. The display controller receives a first video source and a second video source for multi-window display, including a line buffer, a deinterlacer, a scaler, and a memory interface unit. The line buffer buffers pixel data of a non-overlapped area of a main image associated with the first video source and pixel data of a sub image associated with the second video source. The line buffer may be implemented as two independent line buffers for buffering pixel data associated with the main image and the sub image respectively. Alternatively, the line buffer may be implemented as a shared line buffer for buffering pixel data associated with the main image and the sub image together. The deinterlacer is coupled to the line buffer for selectively deinterlacing data in the line buffer. The scaler is coupled to the deinterlacer for selectively scaling data outputted from the deinterlacer. The memory interface unit is coupled to the line buffer for accessing an external memory, such as a DRAM.

The present invention further discloses a memory access method for displaying multiple windows, which includes the following steps: accessing data of a non-overlapped area of a main image associated with a main window while skipping data of an overlapped area of the main image; accessing complete data of a sub image associated with a sub window; and spreading memory bandwidth by prefetching during a blanking interval. The non-overlapped area is determined according to display positions and scaling ratios of the main window and the sub window.

The foregoing and other features of the invention will be apparent from the following more particular description of embodiment of the invention.

BRIEF DESCRIPTION OF THE PICTURES

The present invention is illustrated by way of example and not intended to be limited by the accompanying drawing, in which like notations indicate similar elements.

FIGS. 4A, 4B and 4C illustrate the data process of a multi-window display controller according to one embodiment of the present invention;

FIGS. 5A and 5B illustrate a buffering structure for PIP display according to one embodiment of the present invention;

Figure 1:
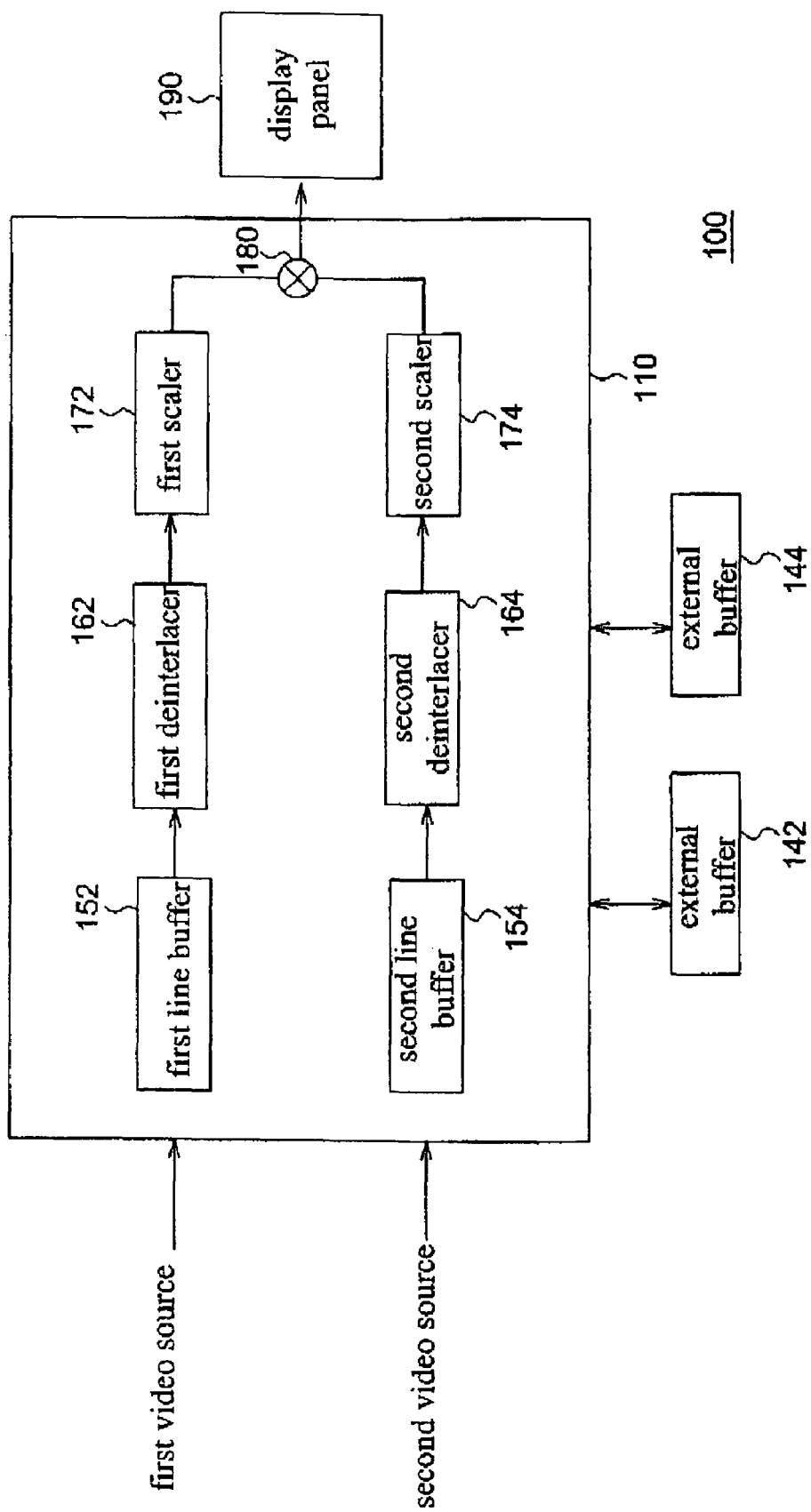
FIG. 1 is a functional block diagram of a multi-window display system according to the prior art.
Figure 2:
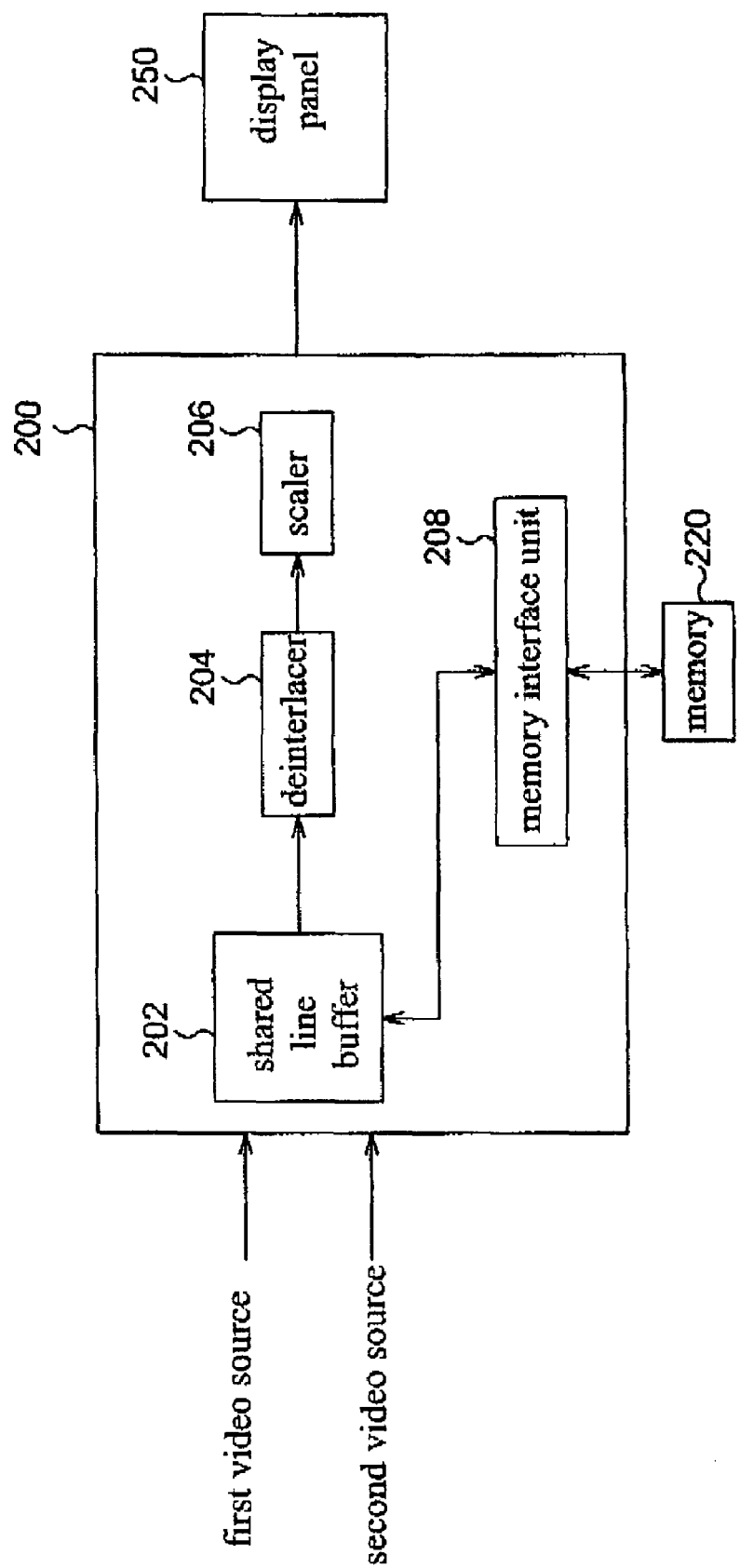
FIG. 2 is a circuit block diagram of a display controller capable of displaying multiple windows according to one embodiment of the present invention.
Figure 7:
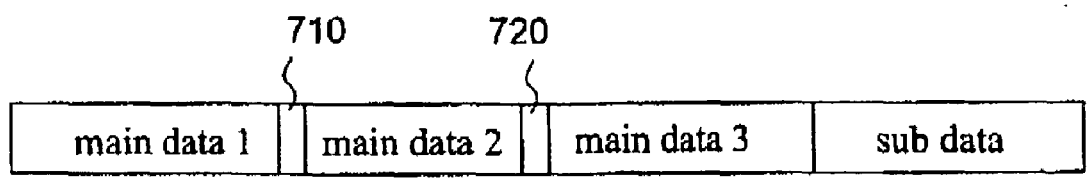
Figure 8:
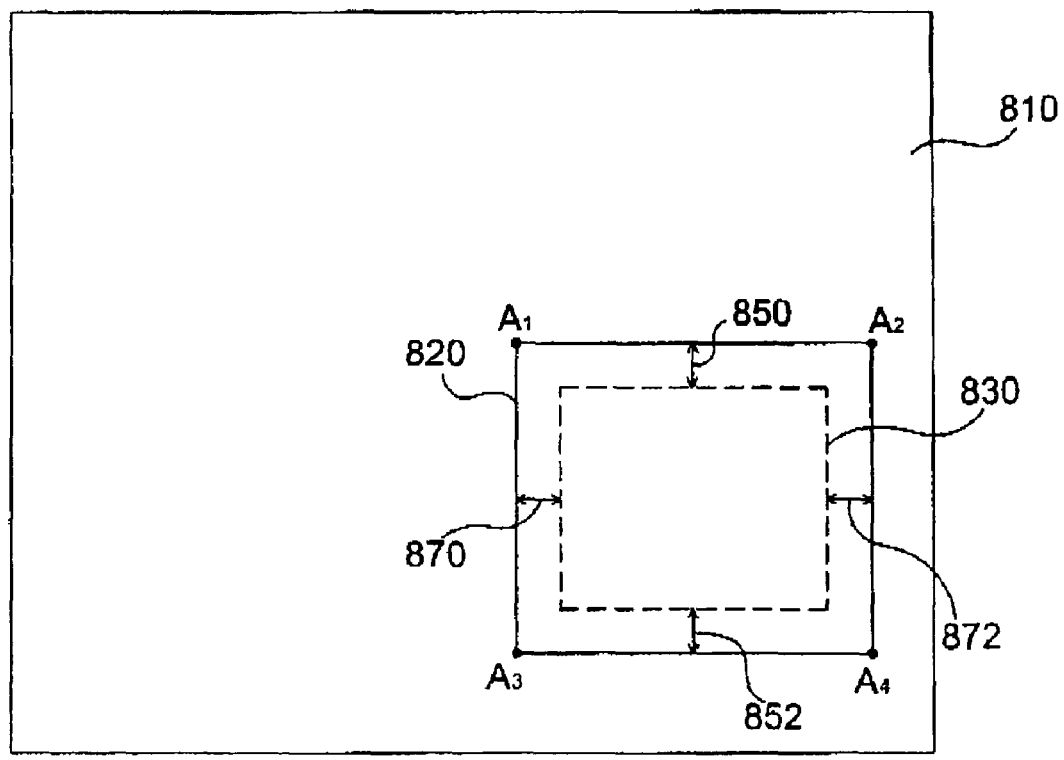
Figure 9A:
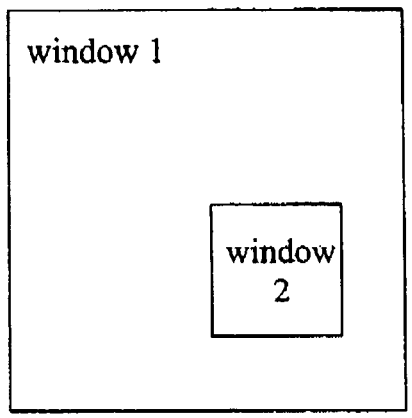
Figure 9B:
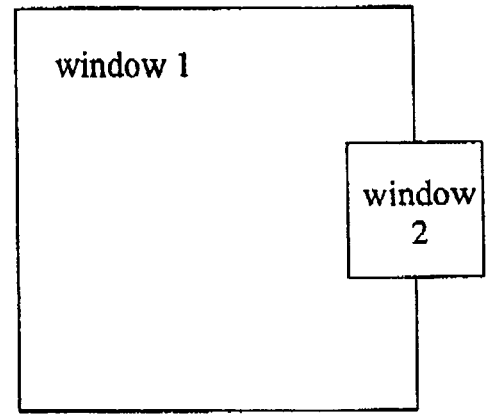
Figure 9C:
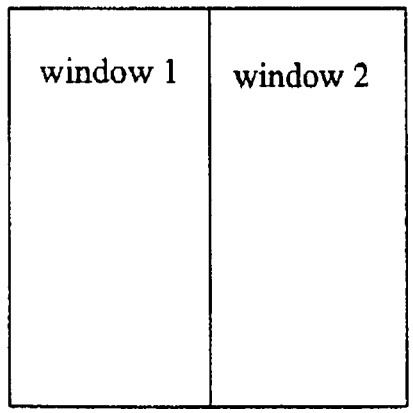
Figure 9D:
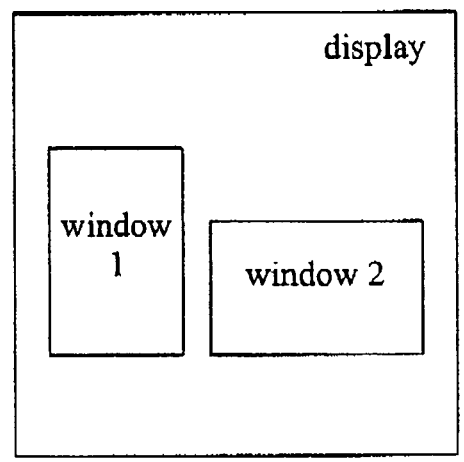
Figure 10:
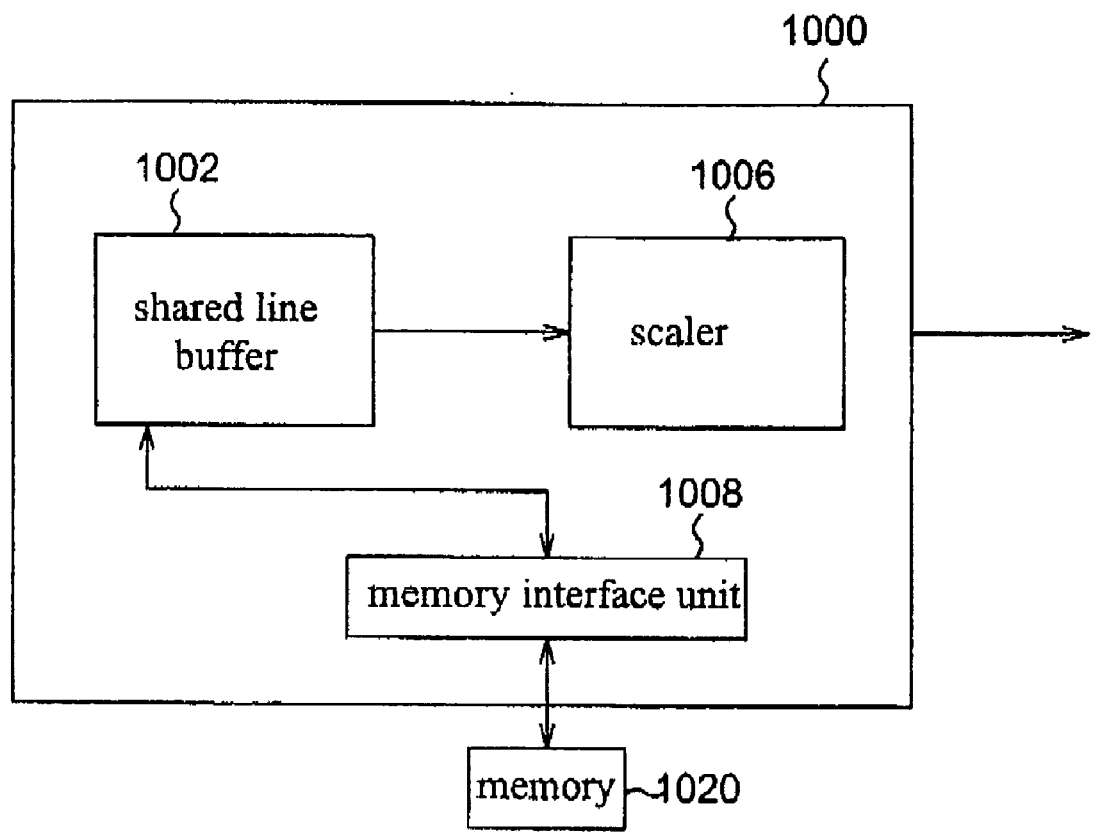
Figure 11:
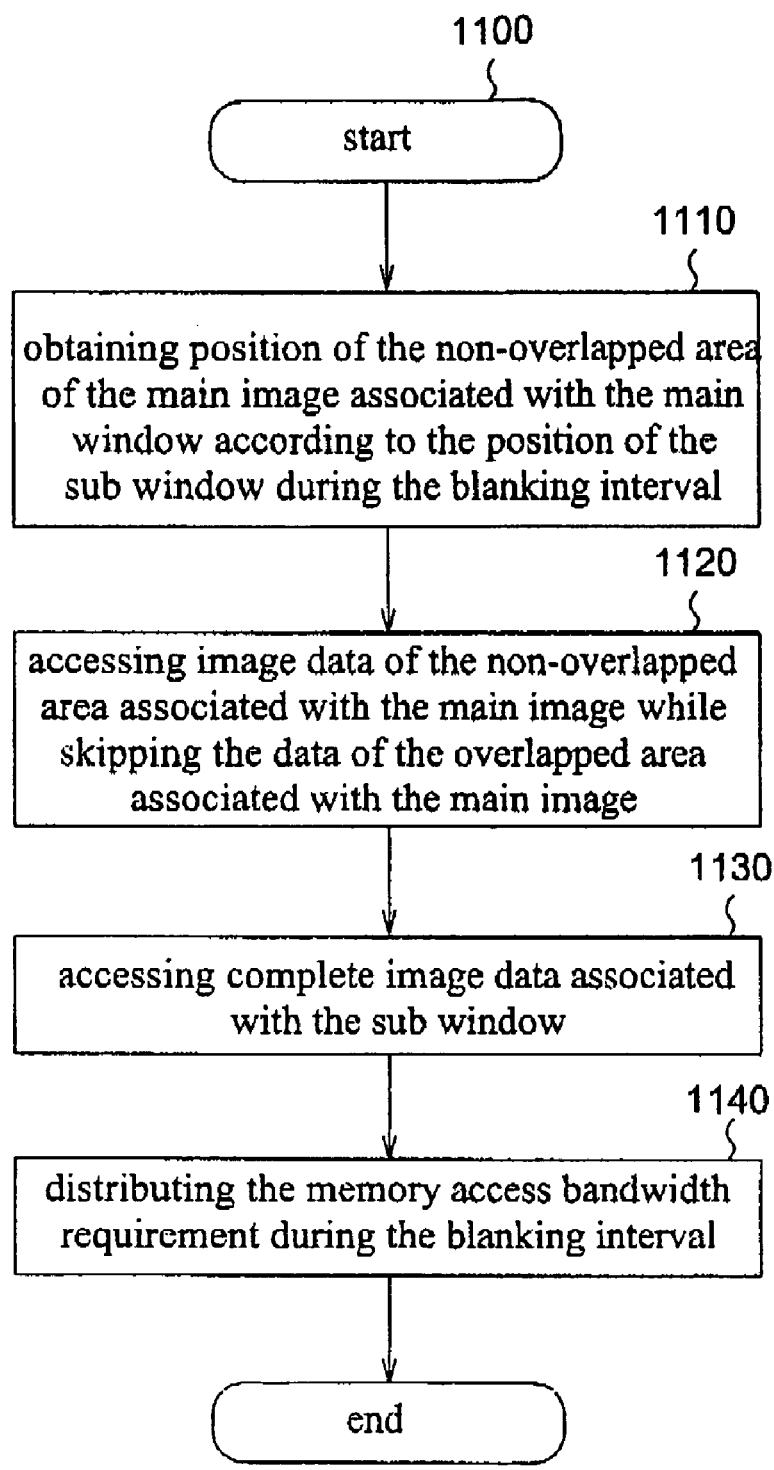

FIGS. 6A, 6B, and 6C are schematic diagrams showing data access of the shared line buffer in FIG. 2 accompanying the embodiment of FIG. 5B according to one embodiment of the present invention;

FIG. 7 shows a data structure for storing scan line data in the shared line buffer according to one embodiment of the present invention;

FIG. 8 shows the data access for the main image according to one embodiment of the present invention;

FIGS. 9A, 9B, 9C and 9D show different types of multi-window display;

FIG. 10 shows a circuit block diagram of a display controller capable of displaying multiple windows according to another embodiment of the present invention; and FIG. 11 a flowchart of a memory accessing method for multi-window display according to one embodiment of the present invention.

DETAILED DESCRIPTION OF THE INVENTION

A multi-window display controller with a shared line buffer and associated method are disclosed in the present invention. To make the disclosure of the present invention more detailed and complete, references are made to the following description in conjunction with the accompanying drawings. Nevertheless, the apparatus, elements and steps of the method described in the following embodiments are only for illustration but not to limit the scope of the present invention.

FIG. 2 shows a circuit block diagram of a display controller 200 for displaying multiple windows according to one embodiment of the present invention, which includes a shard line buffer 202, a deinterlacer 204, a scaler 206, and a memory interface unit 208.

The multi-window display controller 200 receives a first video source and a second video source. For example, the first video source and the second video source can be two different TV signals, or one TV signal and one DVD signal respectively. The first video source and the second video source may be pre-processed and stored to the memory 220 through the memory interface unit 208 by the display controller 200 for the subsequent multi-window display process. For example, the memory 220 can be an external DRAM. The scan line data which are respectively associated with the first and the second video sources can be buffered in the shared line buffer 202 together. The mechanism for the shared line buffer 202 to be shared by the different video sources will be described in detail below.

The deinterlacer 204 deinterlaces data of scan lines buffered in the shared line buffer 202 to generate deinterlaced output, and the scaler 206 scales the deinterlaced output from the deinterlacer 204 to generate the scaled output. The deinterlacer 204 and the scaler 206 perform appropriate processes according to the video sources and the display mode for generating multi-window display on the display panel 250.

Before being displayed on the panel 250, some post-processes can be performed on the data outputted from the scaler 206, such as color management, overdrive process, and gamma curve adjustment. Preferably, the output terminal of the scaler 206 may couple to an output line buffer (not shown), which is capable of buffering a plurality of image pixels outputted from the scaler 206 to adjust pixel rate for real-time output. For example, an output line buffer with 300 pixels length (not shown) can be applied.

Figure 3:
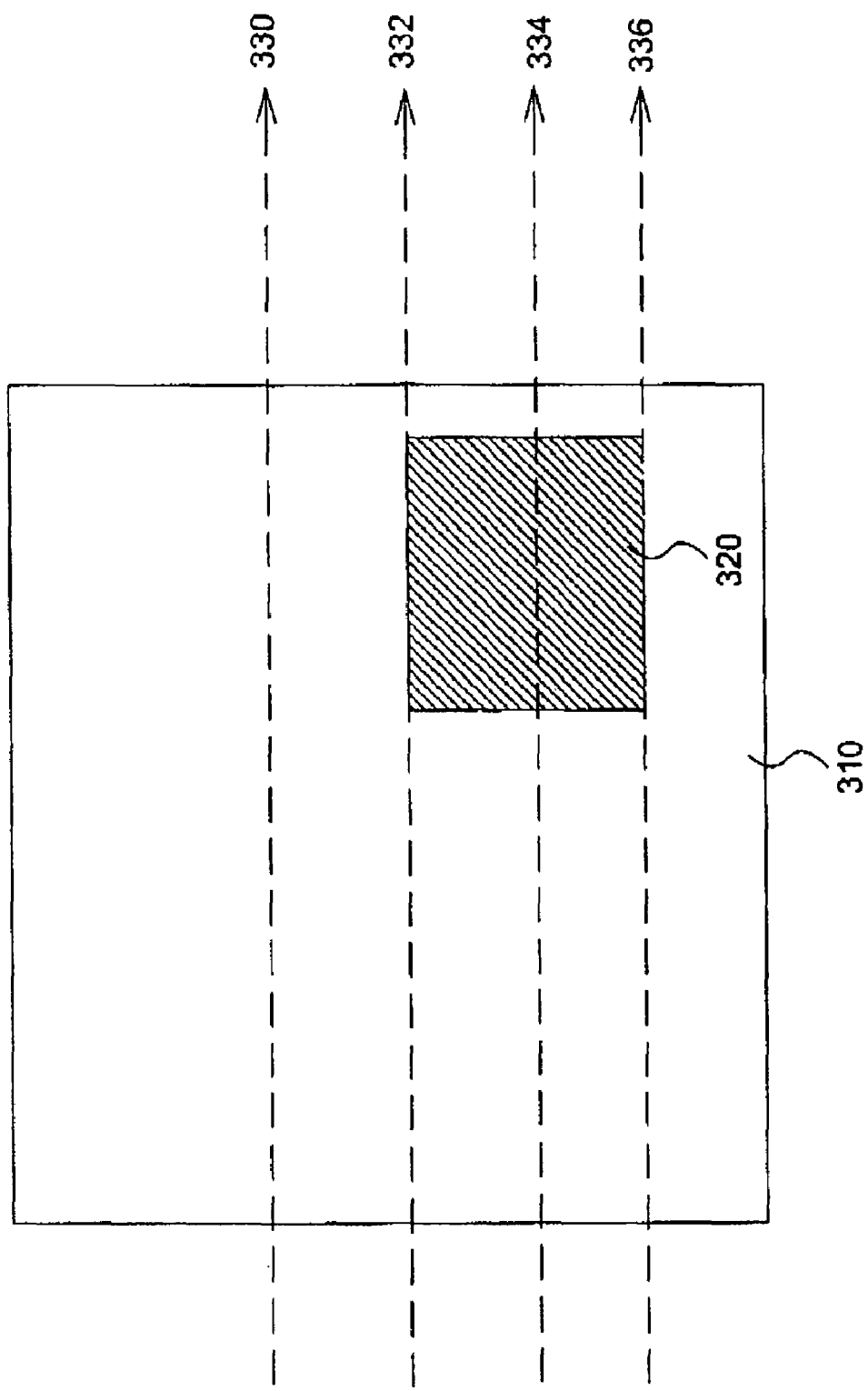
FIG. 3 shows a multi-window display screen.

FIG. 3 shows a multi-window display image which includes a main image 310 and a sub image 320. For the scan lines before the scan line 332, e.g. scan line 330 and after the scan line 336, the display controller only has to process the data associated with the main image 310. For the scan lines between the scan lines 332 and 336, the display controller has to process both the data associated with the main image 310 and the data associated with the sub image 320.

FIGS. 4A-4C illustrate the data process flow for the multi-window display controller in accordance with one embodiment of the present invention. Referring simultaneously to FIGS. 2, 3, and 4A-4C, FIG. 4A shows one scan line of the display image, and FIGS. 4B and 4C illustrate scan line data, corresponding to the scan line in FIG. 4A, which are respectively buffered in the shared line buffer 202 to be processed by the deinterlacer 204 and the scaler 206. FIG. 4C illustrates the data output by the scaler 206 and stored in an output line buffer (not shown).

FIG. 4A shows a scan line where the main image and the sub image both appear, e.g. the scan line 334 in FIG. 3, including a main image scan line data 410, a sub image scan line data 420, and the main image scan line data 412. For the purpose of illustration, it is assumed that, for the scan line 334, the main image scan line data 410 includes 200 pixels, the sub image scan line data 420 includes 100 pixels, and the main image scan line data 412 includes 50 pixels.

FIG. 4B is a schematic diagram for buffering scan line data of both the sub and main images by the shared line buffer 202. The scan line data 430 corresponds to the main image scan line data 410, the scan line data 440 corresponds the sub image scan line data 420, and the scan line data 432 corresponds to the main image scan line data 412. It is assumed that the video source of the main image is displayed on the display panel 250 after being enlarged twice and the video source of the sub image is displayed on the display panel 250 directly without any size scaling. There are 100 pixels of scan line data 430, 100 pixels of scan line data 440, and 25 pixels of the scan line data 432 in the shared line buffer 202. Preferably, except for the scan line data 430, 440, and 432, the shared line buffer 202 can store an extra amount of main image data near the boundary between the main image and the sub image, such as data 451 and 452, for the following scaling process, which will be described in detail later.

As shown in FIG. 4C, after the scan line data in FIG. 4B are image processed, e.g. deinterlacing and scaling process, and then be buffered in an output line buffer (not shown) for being outputted to the display panel 250. Each outputted scan line includes 200 pixels of the main image scan line data 460, 100 pixels of sub image scan line data 470, and 50 pixels of the main image scan line data 462.

During the image processing, e.g. image scaling, a plurality of neighboring pixels are required. It should be noted that there is discontinuity between scan lines above and below an upper boundaries between the main and the sub images, e.g. the scan line 336 in FIG. 3. These scan lines are unable to directly reference each other for image processing, which destroys display quality on the boundary. In one embodiment, a borderline frame is provided by covering the boundary between the sub image and the main image.

FIG. 5A illustrate a schematic diagram for storing image data in the external memory 220 according to one embodiment of the present invention. In this embodiment, the memory 220 allocates a space for storing the scan line data associated with the main image and an extra space. For example, referring to FIG. 5A, if the display resolution to be supported is up to 1366*1768, the memory 220 allocates a plurality of scan line spaces 500 for storing images, to facilitate accessing the shared line buffer 202 in FIG. 2. In this embodiment, each scan line space 500 includes a first part S10 for buffering scan line data corresponding to 1366 pixels of a main image and a second part 520 for buffering scan line data with approximate 634 pixels for a sub image. Each scan line space 500 includes 2000 pixels in total.

FIG. 5B shows a schematic diagram for the external memory 220 in FIG. 2 buffering the data of the main image 530 and the sub image 535 in an output display view. The memory 220 buffering the scan line data of the main image 530 in the first part 510' and buffering the scan line data of the sub image 535 in the second part 520' in the allocated buffer region 500'. In this embodiment, the memory 220 skips data of the main image 530 overlapping the sub image 535. In this embodiment, the boundary between the sub image and the main image can be covered by a borderline frame. It should be noted that the spare spaces 555 and 555' in the buffer region 500' are only for illustrating the storing process of the image data. Persons skilled in the art may modify the structure of the buffer region 500' in the memory 220 according to the actual design needs for further saving the memory space. In this embodiment, the external memory 220 may skip the data of the overlapped area for the main image 530 directly during the image preprocess or while receiving, without storing the data of the main image 530 overlapping the sub image 535. The external memory 220 requires several temporally neighboring images for image process, e.g. deinterlacing process. As the display resolution raises, the present invention significantly saves the capacity requirement of the external memory 220, the data access bandwidth between the display controller 200 and the external memory 220, and the capacity requirement of the shared line buffer 202 in FIG. 2.

In another embodiment, the display quality on the boundary between the sub image and the main image is improved as desired, without the borderline frame. The memory 220 stores extra amount, a small portion, of the main image 530 overlapped by the sub image 535 adjacent to the boundary between the main image 310 and the sub image 320 for image boundary processing. For example, referring to FIGS. 2 and 3, the data of a predetermined depth for the main image near the upper, lower, night, and left borders of the sub image 320 are stored for the image scaling process of the main image 310 on the boundary between the main image 310 and the sub image 320. For example, the memory 220 further stores two partial scan lines for the main image 310, which are respectively above and below the borders of the sub image 320 for scaling process. Moreover, the memory 220 further stores the data of a plurality of pixels for the main image 310 adjacent to the right and left borders of the sub image 320, e.g. for horizontal scaling process. Therefore, the majority of pixel data of the main image 310 overlapped by the sub image 320 is skipped directly during the image preprocess, and thus the increase of capacity requirement of the memory is negligible compared with the previous embodiment.

FIGS. 6A, 6B, and 6C illustrate the process of data access of the shared line buffer 202 according to the output display view in FIG. 5B. For example, the shared line buffer 202 in FIG. 2 is capable of buffering data of six scan lines, such as scan lines L1, L2, L3, L4, L5, and L6 with similar structure to the structure 500 in FIG. 5A.

FIG. 6A shows the content of the scan lines near the scan line 332 on the upper boundary between the main image 310 and the sub image 320 in FIG. 3. The scan lines L1, L2, and L3 store image data of the main image 310 above the scan line 332, including the main data 1, the main data 2, and the main data 3. The scan lines LA, L5, and L6 store scan line data of the complete main image 310 and the scan line data of the sub image 320, including the main data 1, the main data 2, the main data 3, and the sub data. The scan line L4 corresponds to the start of upper border of the sub image 320. It should be noted that the main data 2 associated with the main image 310 stored in the scan lines L4, L5, and L6 are not for displaying the area inside the sub image 320. As described above, the scan lines L4, L5, and L6 store an extra amount of the data with the predetermined vertical depth for the main image 310 for performing image process on the pixels of the main image 310 near the upper border of the sub image 320, such as the deinterlacing and scaling process, to generate the perfect adjacent image display.

FIG. 6B shows the content of scan lines away from the boundary between the main image 310 and the sub image 320, e.g. the scan line 334 in FIG. 3. In FIG. 6B, the scan lines L1, L2, L3, L4, L5, and L6 store the main data 1, the horizontal extra pixel data 610 and 620, the main data 3, and the sub data. Preferably, most data of the main image 310 within the area of the sub image 320 and away from the upper border and the lower border of the sub image is skipped during the image preprocess. As described in the above embodiment, in FIG. 6B, the scan lines L1, L2, L3, L4, L5, and L6 store an extra amount of the data with the predetermined horizontal depth for the main image 310. In other words, the scan lines L1, L2, L3, L4, L5, and L6 further fetch small amount of data of the main image 310 inwardly at the night and left borders of the sub image 320 with the predetermined horizontal depth, including the horizontal extra pixel data 610 and 620, for performing image processes, e.g. the deinterlacing and scaling processes, on the pixels of the main image 310 near the right and left borders of the sub image 320.

FIG. 6C shows the content of the scan lines near the scan line 336 on the boundary between the main image 310 and the sub image 320. The scan lines L1, L2, and L3 store the main data 1, the horizontal extra pixel data 610 and 620, the main data 3, and the sub data. In this embodiment, the scan line L6 stores data corresponding to the scan line on the lower border of the sub image 320, i.e. the scan line 336 in FIG. 3, and the scan lines LA, L5, L6 store the complete scan line data of the main image 310 and the complete scan line data of the sub image 320, including the main data 1, the main data 2, the main data 3, and the sub data. It should be noted that the scan lines L4, L5, L6 store the main data 2 associated with the main image 310 for image processing instead of displaying the area for the main image 310 inside the sub image 320. As described above, the scan lines L4, L5, and L6 store an extra amount of the data with the predetermined vertical depth for the main image 310 for performing image process, e.g. the deinterlacing and scaling processes, on the pixels of the main image 310 near the lower border of the sub image 320 to generate the perfect adjacent image display.

Referring to FIG. 2, the display controller 200 receives the first video source and the second video source for multi-window display. The image data to be displayed on the panel 250 are processed line by line by the display controller 200. In this embodiment, when the image data buffered in the external memory 220 are fetched into the shared line buffer 202, the shared line buffer 202 can buffer data of up to six scan lines for main/sub images. It should be noted that when fetching the data near the border of the sub image 320 in FIG. 3, as described according to FIGS. 6A, 6B, and 6C, the memory access bandwidth may burst. For example, as shown in FIG. 6A, for generating perfect image border for the main image 310 adjacent to the sub image 320, the scan lines LA, L5, L6 require complete scan line data of the main image 310 and the complete scan line data of the sub image 320. However, burst memory access may fail the operation of the display controller 200 or destroy the outputted image. Several solutions to this problem may be submitted, such as operating the display controller 200 at higher frequency, and/or applying two external memories 220 to increase the access bandwidth of the bus. In this embodiment, preferably, the data required by the shared line buffer 202 are prefetched during the horizontal or vertical blanking interval, so that the memory bus access bandwidth required for multi-window display is similar to the single window display, to eliminate memory access burst. Therefore, the operating frequency of the display controller 200 according to the present invention doesn't need to be increased.

For example, in FIG. 3, above the scan line 332 on the upper border of the sub image 320, the shared line buffer 202 only buffers the data of the main image 310 for display processing, such as in FIG. 6A, where the sub data portions of the scan line L1, L2, and L3 are left unused. The first three scan lines of the sub image 320 in FIG. 3, starting at the scan line 332 on the upper border of the sub image 320, require the complete scan line data of the main image 310 and the complete scan line data of the sub image, such as the scan lines L4, L5, L6 in FIG. 6A. It should be noted that, for the scan lines above the scan line 332 on the upper border of the sub image 320, the sub data portions of the scan line data in FIG. 6A are left unused. Above the scan line 332 on the upper border of the sub image 320, the sub data of the scan lines LA, L5, and L6 in FIG. 6A are prefetched during the horizontal blanking interval or the vertical blanking interval. Therefore, when the display controller 200 processes the scan line 332 on the upper border of the sub image 320, which corresponds to the scan line L4 in FIG. 6A, the sub data of the scan lines L4, L5, and L6 have already been prepared in the shared line buffer 202. Therefore, the shared line buffer 202 only accesses the data of the main image 310 on the scan line 332 from memory 220 since the sub data of the scan lines L4, L5, and L6 are already prefetched, thus eliminating the burst of the memory access bandwidth and stabilizing the display controller 200 operation.

In FIG. 6A, the sub data portions of scan lines L1, L2, and L3 are shown as empty for the purpose of illustration only. The shard line buffer 202 can be designed as a cyclic buffer. For example, the prefetched sub data portions of the scan lines L4, L5, and L6 correspond to the first to third scan lines of the sub image 320 in FIG. 3, and, in cyclic view, the sub data portions of the scan lines L1, L2, and L3 correspond to the fourth to the sixth scan lines of the sub image 320. The sub data portions of scan lines L1, L2, and L3 of the shared line buffer 202 are left unused above the scan line 332 on the upper border of the sub image 320. Preferably, above the scan line 332 on the upper border of the sub image 320, the data associated with the fourth to sixth scan lines of the sub image 320 are prefetched to be stored in the sub data portions of the scan lines L1, L2, and L3 of the shared line buffer 202 during the blanking interval.

In FIG. 6B, the shared line buffer 202 accesses a small amount of extra horizontal pixel data 610 and 620, rather than accessing the whole main data 2 portion, for the image process for the main image 310 near the right and left borders of the sub image 320. Therefore, the amount of the accessed data is almost the same with that before the scan line 332 on the upper border of the sub image 320. Preferably, the memory access bandwidth can be spread out by prefetching the data during the horizontal blanking interval, to ease the whole memory access bandwidth. In FIG. 6C, there is a great amount of data to be accessed for the scan lines IA, L5, L5 of the shared line buffer 202 near the scan line 336 on the lower border in FIG. 3. In this embodiment, as shown in FIG. 6C, the data of the main data 2 portion of the scan lines L4, L5, and L6 can be prefetched during the horizontal interval of scan lines L1, L2, and L3 in FIG. 6C. In another embodiment, an extra space for storing a plurality of pixels is allocated in each of the scan lines in the shared line buffer 202, so that the small amount of the horizontal extra pixel data 610 and 620 in FIG. 6B are stored in this extra space without occupying the space of the main data 2 portion in FIG. 6B, for more flexible prefetching. As shown in FIG. 7, a scan line 700 is applied to each scan line of the shared line buffer 202, including the main data 1 portion, the main data 2 portion, the main data 3 portion, the sub data portion, and the horizontal extra pixel data 710 and 720, which are applied to FIGS. 6A, 6B, and 6C for independently accessing of several data portions in multi-window display. It should be noted that the amount of the horizontal extra pixel data 710 and 720, which can be determined by the hardware structure and the scaling ratio of the horizontal scaler (not shown), is very small and negligible as compared with hundreds of the hardware gates saved by the shared line buffer 202. The perfect image borders can be generated by utilizing the horizontal extra pixel data 710 and 720.

Referring to FIG. 6C again, the main data 2 portions of the scan lines after the first three scan lines of the sub image 320 in FIG. 3 are left unused in previous example. In this embodiment, applying the structure of the scan line data 700 in FIG. 7, the main data 2 portions of the scan lines L4, L5, L6 are prefetched during the horizontal blanking interval. In other words, the shared line buffer 202 prefetches a plurality of partial scan lines associated with the main image while overlapping the sub image during the blanking interval. Furthermore, the shared line buffer 202 are designed as a cyclic buffer, so the data of the main data 2 portions of the scan lines L1, L2, L3, IA, L5, and L6 in FIG. 6C are prefetched during the horizontal blanking intervals after the first three scan lines of the sub image 320 in FIG. 3. It is apparent that the main data 2 portions of the scan lines L1, L2, and L3 correspond to the data of the main data 2 portions of the three scan lines associated with the main image 320 below the scan line 336 on the lower border of the sub image 320 in FIG. 3. Various modifications may be made by persons skilled in die art in view of the teaching of the present invention without departing from the spirit and scope of the present invention.

FIG. 8 is a schematic diagram showing the data access for the main image 810 according to the embodiment of FIGS. 6A, 6B, and 6C. In accordance with FIG. 3, the symbol 820 represents the region of the sub image 820 being displayed, and the dotted line frame 830 represents the range of the main image 810 actually being accessed by the shared line buffer 202 and/or the external memory 220. Namely, except for the displayed range of the main image 810, the data with the predetermined vertical depths 850, 852 and the predetermined horizontal depths 870, 872 associated with the main image 810 are also accessed, wherein the predetermined vertical depths 850, 852 and the predetermined horizontal depths 870, 872 can be predetermined according to the hardware structure and scaling ratio of the vertical scaler (not shown)

and the horizontal scaler (not shown). In this embodiment, the data associated with the main image 810 within the dotted line frame 830 can be skipped during the image preprocess, and therefore the amount of the data accessed between the display controller 200 and the external memory 220 in FIG. 2 can be significantly reduced. The display position and the window size of the sub image 820 in FIG. 8 can be determined by a user, and the image pixel coordinates Z1, Z2, Z3, and Z4 (not shown) of original video source corresponding to the four apexes A1, A2, A3, and A4 of the displayed sub image 820 can be determined during the vertical and/or horizontal blanking interval according to the scaling factor. Based on the image pixel coordinates Z1, Z2, Z3, and Z4 of original video source corresponding to the apexes of the sub image 820, the predetermined vertical depths 850 and 852, and the predetermined horizontal depths 870 and 872, the shared line buffer 202 in FIG. 2 can prefetch the data of boundary pixels described in the above embodiment for reducing the memory access bandwidth.

Please refer to FIG. 5B again. As described above, FIG. 5B shows data access in an output display view. It should be noted the spaces 555 and 555' associated with the main image 530 and the sub image 535 represent different horizontal length in the line buffer 202 in FIG. 2 due to different scaling ratios though the spaces 555 and 555' have the same width of the sub image 535 in the output display view. The area of the sub image 535 in the output display view represents different sizes in the line buffer 202 for the main image 530 and the sub image 535, due to different horizontal and vertical scaling ratios. For example, in FIG. 6A, main data 2 portion and sub data portion in scan line L6 have different data length although their output display length may look similar. For example, assume the main image 530 is scaled up 2.5 times and the sub image 535 is scaled by 1 time. When a scan line of the sub image 535 contains 480 pixels in the line buffer 202, the same width of the scan line of the sub image 535 in the output view for the main image 530 should contain 192 pixels (=480/2.5) in the line buffer 202. Similarly, the same height for the sub image 535 and the main image 530 in the output display view represents different number of scan lines in the line buffer 202. Therefore, according to the above disclosure, persons skilled in the art can precisely determine access addresses in the line buffer 202 and the memory 220, in FIG. 2, for the main image 530 and the sub image 535, in FIG. 5, from the output display view according to the scaling ratio.

It should be noted that the above-mentioned embodiment is only an illustrative type of the multi-window display, and other types of the multi-window display are also possible, as shown in FIGS. 9A, 9B, 9C, and 9D. Various modifications may be made by persons skilled in the art in view of the teaching of above embodiments without departing from the scope of the invention.

As described above, the present invention can reduce the requirement of the memory access bandwidth for the multi-window controller, and decrease the pin counts to the external memory. For example, the multi-window display controller of the present invention can be packaged as a QFP (quad flat package) IC chip by the low-cost QFP packaging, thereby reducing the package cost. The present invention can lower the requirement of the capacity of the external memory, for example, the multi-window display controller of the present invention can utilize one 16-bit-DDR DRAM for multi-window display, up to HD 1920*1200 panel, without requiring high speed/high bandwidth external memory.

To achieve the similar purpose of saving the memory access bandwidth, the structure shown in FIG. 2 can be modified by persons skilled in the art in view of teachings of the present disclosure. For example, FIG. 10 shows a circuit block diagram of a multi-window display controller 1000 according to another embodiment of the present invention, including a shared line buffer 1002, a scaler 1006, and a memory interface unit 1008. For the scaling process of the multi-window display, the display controller 1000 accesses the image data of the non-overlapped area of the main image associated with the first video source and the image data of the sub image associated with the second video source from the memory 1020 through the shared line buffer 1002, and skips the data of the overlapped area associated with the maim image. The image data stored in the memory 1020 may have been deinterlaced (not shown). Furthermore, the persons skilled in the art can utilize independent line buffers to buffer the image data of the non-overlapped area of the main image and the image data of the sub image while skipping the data of the overlapped area associated with the main image, for saving the memory access bandwidth and reducing the clock frequency of the multi-window display controller 1000.

FIG. 11 is a flowchart of a memory accessing method for multi-window display in accordance with one embodiment of the present invention. The flowchart begins in step 1110. In step 1110, a position of a non-overlapped area of a main image associated with a main window is determined according to position of a sub window and a scaling ratio during a blanking interval. In step 1120, the image data of the non-overlapped area associated with the main image is accessed, and the image data of the overlapped area associated with the main image is skipped. Preferably, the non-overlapped area of the main image can be determined according to display positions and scaling ratios of the main window and the sub window. For example, as shown in FIG. 8, the non-overlapped area includes the range from the frame of the main image 810 to the dotted line frame 830. In step 1130, the complete data of the sub image associated with the sub window is accessed. In step 1140, the required memory access bandwidth is spreading out by prefetching during the horizontal and/or vertical blanking interval. Preferably, the data of a plurality of scan lines of the sub image associated with the sub window is accessed during the blanking interval above the upper image border for, e.g. scaling. Preferably, a plurality of partial scan lines with the predetermined vertical depth for the main image associated with the main window are prefetched by the line buffer during the horizontal blanking interval below the upper image border and above the lower image border.

To sum up, the present invention discloses a multi-window display controller, capable of receiving a first video source and a second video source for displaying multiple windows. The display controller includes a line buffer, a deinterlacer, a scaler, and a memory interface unit. The line buffer buffers pixel data of a non-overlapped area for a main image associated with the first video source and pixel data for a sub image associated with the second video source. The line buffer may be implemented as two independent line buffers which respectively buffer pixel data associated with the main image and the sub image. Alternatively, the line buffer may be implemented as a shared line buffer for buffering pixel data associated with the main image and the sub image together. The present invention skips the data of the overlapped area associated with the main image, and thus the memory access bandwidth is significantly reduced. The deinterlacer is coupled to the line buffer for selectively deinterlacing the data in the line buffer. The scaler is coupled to the deinterlacer for selectively scaling the data outputted from the deinterlacer. The memory interface unit is coupled to the line buffer for accessing an external memory, e.g. a DRAM. The present invention also discloses a memory access method for displaying multiple windows, including the following steps: accessing data of a non-overlapped area of a main image associated with a main window while skipping data of an overlapped area for the main image; accessing complete data of a sub image associated with a sub window; and spreading out memory bandwidth by prefetching during a blanking interval. The non-overlapped area is determined according to display positions and scaling ratios of the main window and the sub window.

While this invention has been described with reference to the illustrative embodiments, these descriptions should not be construed in a limiting sense. Various modifications of the illustrative embodiment, as well as other embodiments of the inventions will be apparent upon reference to these descriptions. It is therefore contemplated that the appended claims will cover any such modifications or embodiments as falling within the true scope of the invention and its legal equivalents.

What is claimed is:

1. A memory access method performed by a display controller, for receiving a first video source and a second video source, comprising:
    buffering pixel data of a non-overlapped area of a main image associated with the first video source, and pixel data of a sub image associated with the second video source by a line buffer;
    pre-fetching a plurality of scan lines associated with the sub image during a blanking interval;
    generating a deinterlaced data by selectively deinterlacing the data in the line buffer; and
    selectively scaling the deinterlaced data;
    wherein the non-overlapped area is determined according to display positions and scaling ratios of a main window and a sub window.

2. The memory access method of claim 1, further comprising a step of scaling the data of the non-overlapped area of the main image and the complete data of the sub image.

3. The memory access method of claim 1, wherein the blanking interval is a horizontal blanking interval.

4. The memory access method of claim 1, wherein the blanking interval is a vertical blanking interval.

5. The memory access method of claim 1, wherein the sub window comprises an upper border, a lower border, a left border, and a right border.

6. The memory access method of claim 5, wherein the step of buffering the pixel data of the non-overlapped area of the main image associated with the first video source further comprises accessing an extra amount of the main image adjacent to the sub image with a predetermined vertical depth.

7. The memory access method of claim 5, wherein the step of buffering the pixel data of the non-overlapped area of the main image associated with the first video source further comprises accessing an extra amount of the main image adjacent to the sub image with a predetermined horizontal depth.

8. The memory access method of claim 5, wherein the step of buffering the pixel data of the non-overlapped area of the main image associated with the first video source further comprises a step of prefetching an extra amount of the main image adjacent to the sub image with a predetermined vertical depth during a horizontal blanking interval below the upper border and above the lower border.

9. The memory access method of claim 1, further comprising a step of covering boundary between the main window and the sub window with a borderline frame.

10. A display controller for displaying multiple windows, capable of receiving a first video source and a second video source, comprising:
    a line buffer for buffering pixel data of a non-overlapped area of a main image associated with the first video source, and pixel data of a sub image associated with the second video source, wherein the line buffer pre-fetches a plurality of scan lines associated with the sub image during a blanking interval;
    a deinterlace circuit coupled to the line buffer for selectively deinterlacing the data in the line buffer; and
    a scaler coupled to the deinterlace circuit for selectively scaling the data outputted from the deinterlace circuit;
    wherein the non-overlapped area is determined according to display positions and scaling ratios of a main window and a sub window.

11. The display controller of claim 10, further comprising an output buffer coupled to the scaler for buffering a scaled data outputted from the scaler.

12. The display controller of claim 10, further comprising a memory interface unit coupled to the line buffer for accessing an external memory.

13. The display controller of claim 12, wherein the external memory is a 16-bit DDR DRAM.

14. The display controller of claim 10, wherein the line buffer is a shared line buffer.

15. The display controller of claim 10, wherein the display controller is a quad flat package (QFP) integrated circuit chip.

16. The display controller of claim 10, wherein the non-overlapped area is determined according to display positions and scaling ratios of the main window and the sub window.

17. The display controller of claim 10, wherein the line buffer further accesses an extra amount of pixels for the main image adjacent to the sub image with a predetermined vertical depth.

18. The display controller of claim 10, wherein the line buffer further accesses an extra amount of pixels for the main image adjacent to the sub image with a predetermined horizontal depth.

19. The display controller of claim 10, wherein the blanking interval is a horizontal blanking interval.

20. The display controller of claim 10, wherein the blanking interval is a vertical blanking interval.

21. The display controller of claim 10, wherein the line buffer prefetches a plurality of partial scan lines associated with the main image while overlapping the sub image during a blanking interval.

* * * * *